Sept. 28, 1926.

R. F. BOWER

ROLLER BEARING CAGE

Filed Nov. 14, 1921

1,601,103

Inventor
Robert F. Bower

Attorneys

Patented Sept. 28, 1926.

1,601,103

UNITED STATES PATENT OFFICE.

ROBERT F. BOWER, OF DETROIT, MICHIGAN, ASSIGNOR TO BOWER ROLLER BEARING COMPANY, OF DETROIT, MICHIGAN, A CORPORATION OF MICHIGAN.

ROLLER-BEARING CAGE.

Application filed November 14, 1921. Serial No. 514,841.

The invention relates to roller bearing cages and has for its object the provision of a cage having spacers engageable with the rolls to space and align the same, the cage being so arranged that lubricant may freely reach the surfaces of the rolls. With this object, as well as others, in view, the invention resides in the novel features of construction as more fully hereinafter set forth.

Figure 1:
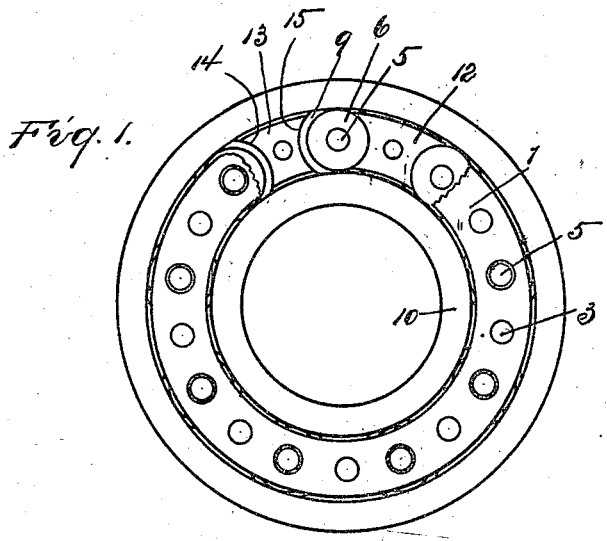
Figure 1 is an end view with parts broken away of a roller bearing embodying my invention.
Figure 2:
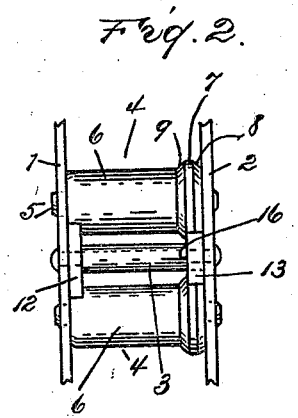
Figure 2 is a side view of a portion thereof.

As shown in Figures 1 and 2, the roller bearing comprises the spaced heads 1 and 2 connected by the shouldered tie bars 3 intermediate the rolls 4 which latter have reduced pivot portions 5 extending through apertures in the heads 1 and 2, these apertures having a greater diameter than the diameter of the pivot portions to permit of limited movement of the rolls relative to the heads. The tie bars are spaced from the rolls a sufficient distance to permit the lubricant to freely reach their surfaces. The rolls have the main cylindrical portions 6 with the enlargements 7 at one end forming opposed inclined bearing surfaces 8 and 9 for taking care of end thrust in opposite directions. The surfaces of the cylindrical portions as well as the inclined bearing portions extend beyond inner and outer peripheries of the heads 1 and 2 to engage corresponding portions in the inner and outer race members 10 and 11 of the roller bearing unit.

For the purpose of properly spacing the rolls 4 and holding the same in parallelism there are the spacer plates 12 and 13 mounted upon the tie bars 3 adjacent to the inner faces of the heads 1 and 2. These spacer plates are provided with the concave edges 14 and 15 respectively substantially conforming to the curvatures of the main cylindrical portions 6 and the cylindrical portion of the enlargement 7 intermediate the inclined bearing portions 8 and 9. The tie bars 3 have the shoulders 16 engaging the inner faces of the spacer plates to hold the same from inward longitudinal movement upon the tie bars. The spacer plates are preferably rotatably mounted upon the tie bars to permit of the rolls finding their proper seats on the spacer plates.

Figure 3:
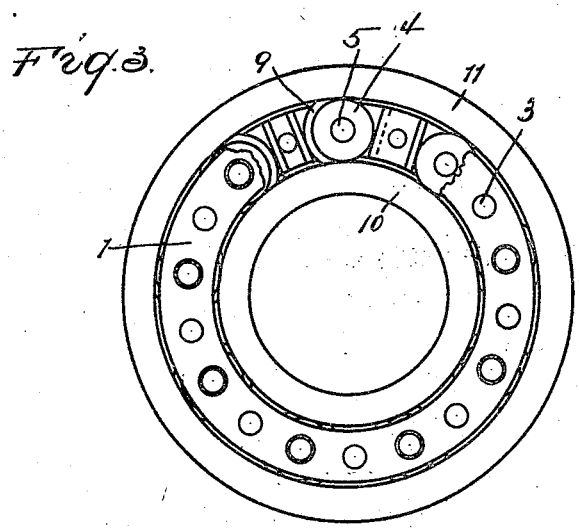
Figures 3 and 4 are views respectively, similar to Figures 1 and 2, of a modified construction.
Figure 4:
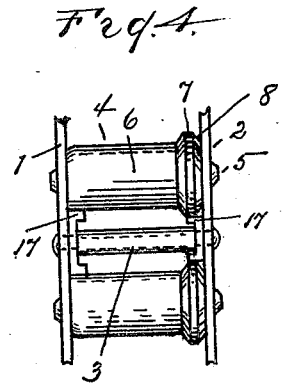

As shown in Figures 3 and 4, there is the same general arrangement of roller bearing cage, but the spacer plates have at their bearing edges the transverse flanges 17 which are parallel to each other and which engage the main cylindrical portions of the rolls and also the cylindrical portions of the enlargements of the rolls. With this arrangement, the material from which the spacer plates are stamped or pressed may be of less thickness than that of which the spacer plates shown in Figures 1 and 2 are stamped and at the same time the width of their bearing surfaces may be as great depending upon the width of the transverse flanges.

From the above description, it will be readily seen that I have provided a roller bearing cage with means for holding the rolls spaced and in parallelism which at the same time permits of free lubrication of the rolls.

What I claim as my invention is:

1. In a roller bearing cage, the combination with spaced heads, of tie bars extending therebetween, and sheet metal spacers mounted on said tie bars and having transversely extending portions engageable with said rolls for relatively short portions of their lengths.

2. In a roller bearing cage, the combination with spaced heads, of tie bars extending therebetween, and sheet metal spacers movably mounted on said tie bars and engageable with the ends only of the rolls.

3. In a roller bearing cage, the combination with spaced heads, of tie bars therebetween, sheet metal spacers engageable with the ends only of the rolls and mounted upon said tie bars, means for preventing more than a limited rotation of said spacers, and means for positioning said spacers longitudinally of the rolls.

4. In a roller bearing cage, the combination with spaced heads, of tie bars extending therebetween intermediate the rolls, and spacers rotatably mounted upon the tie bars and having concave surfaces engageable with the ends only of said rolls to space the same.

5. In a roller bearing cage, the combination with spaced heads, of tie bars extending therebetween intermediate the rolls, spacer members rotatably mounted upon said tie bars and having concave bearing surfaces engageable only with the ends of said rolls to space the same, and shoulders upon said tie bars intermediate said spacer members for positioning the latter longitudinally of said rolls.

6. In a roller bearing cage, the combination with spaced heads, of tie bars extending therebetween intermediate the rolls, and spacer plates rotatably mounted on said tie bars and provided with transverse flanges at their edges of engaging relatively short portions of the rolls to space the same.

7. In a roller bearing cage, the combination with spaced heads, of tie bars extending therebetween intermediate the rolls, spacer plates rotatably mounted upon said tie bars and having flanged edges engageable only with the ends of said rolls, and means for holding said spacer plates in position.

8. In a roller bearing cage, the combination with spaced heads, of tie bars extending therebetween, spacers mounted upon said tie bars and provided with concave surfaces engageable with the rolls for relatively short portions of their length, and means for positioning said spacers longitudinally of the rolls.

9. In a roller bearing cage, the combination with spaced heads, of tie bars extending therebetween intermediate the rolls, and sheet metal spacers rotatably mounted upon said tie bars and having concave edges engageable with the ends only of said rolls.

10. In a roller bearing cage, the combination with spaced heads, of tie bars therebetween and spacers pivotally mounted on said tie bars and having bearing surfaces engageable with said rolls for relatively short portions of their lengths, said bearing surfaces being shaped to prevent more than a limited rotation of said spacers on said tie bars.

In testimony whereof I affix my signature.

ROBERT F. BOWER.